G. F. PETTY.
JAW TRAP.
APPLICATION FILED OCT. 31, 1913.
1,122,151.
Patented Dec. 22, 1914.
2 SHEETS—SHEET 1.
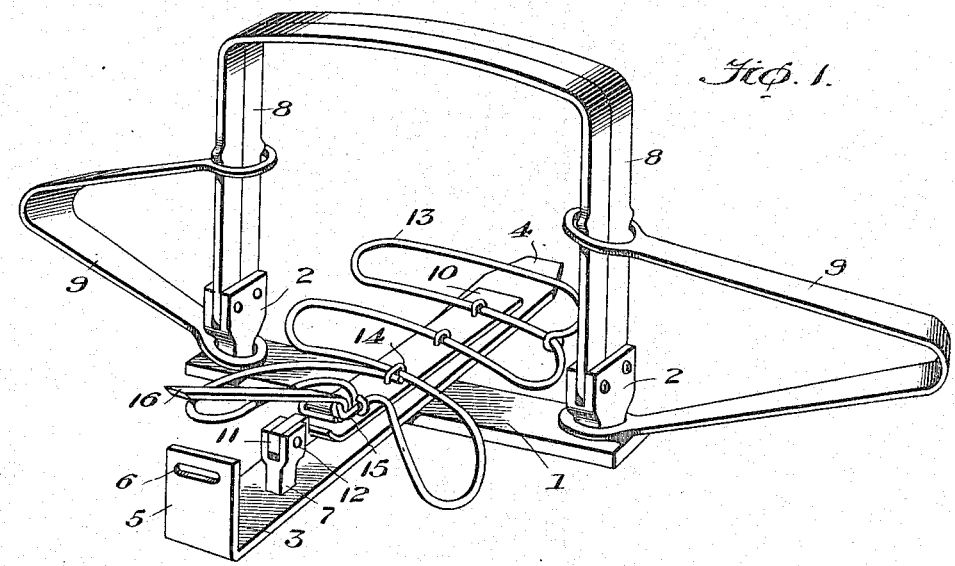
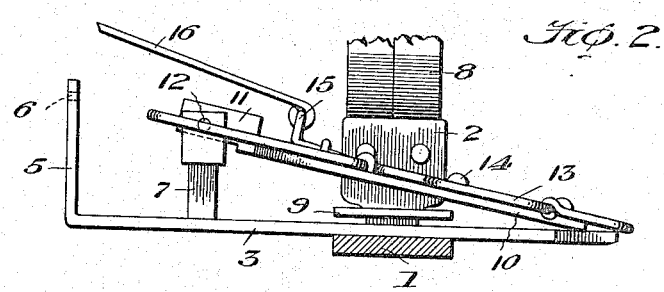
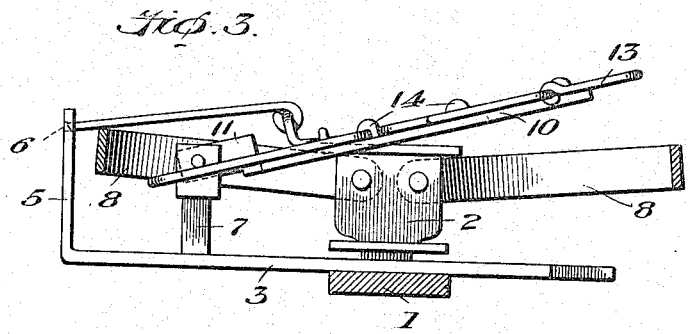

G. F. PETTY.
JAW TRAP.
APPLICATION FILED OCT. 31, 1913.
1,122,151.
Patented Dec. 22, 1914.
2 SHEETS—SHEET 2.
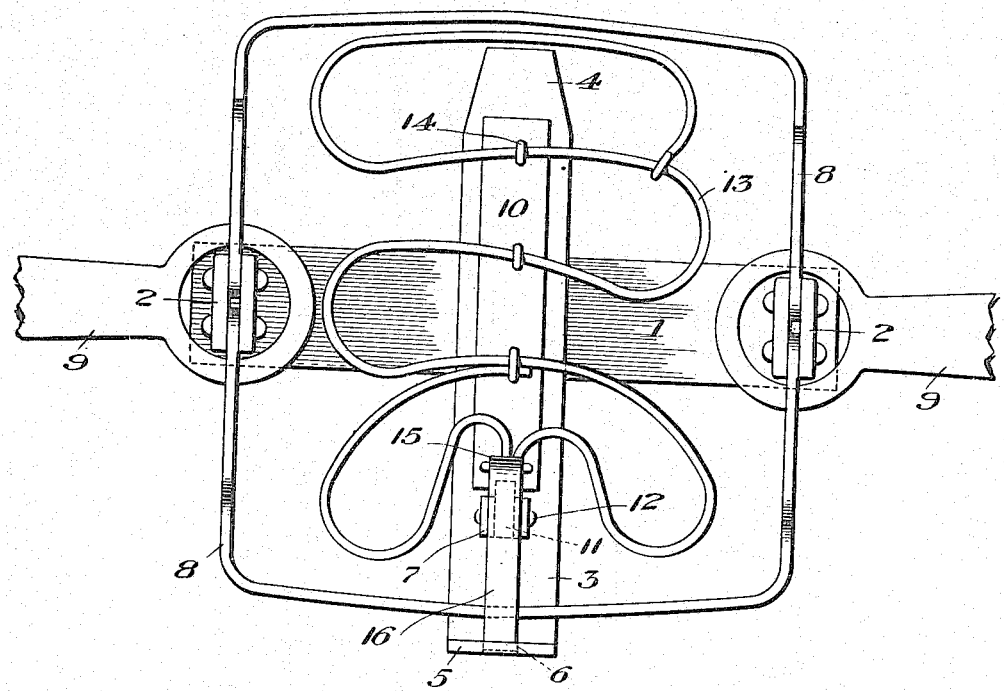
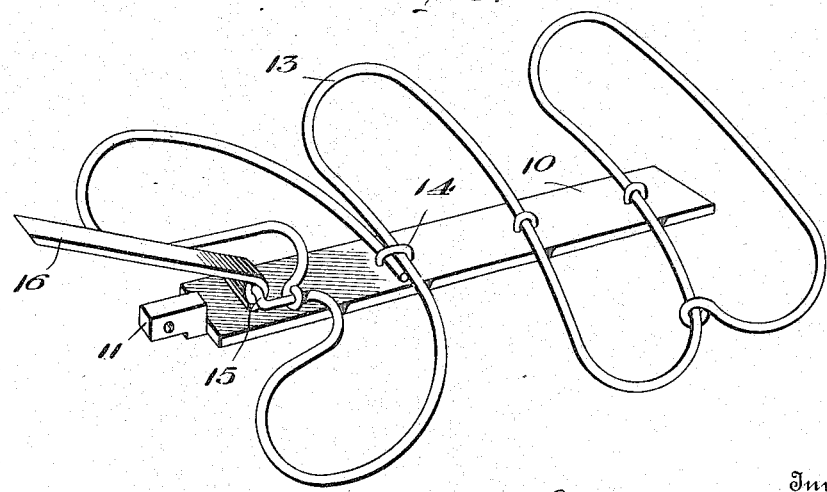
Witnesses
Inventor
George F. Petty
By
Attorney

UNITED STATES PATENT OFFICE.

GEORGE F. PETTY, OF VALLEY SPRINGS, CALIFORNIA.

JAW-TRAP.

1,122,151.　　Specification of Letters Patent.　　Patented Dec. 22, 1914.

Application filed October 31, 1913. Serial No. 798,476.

*To all whom it may concern:*

Be it known that I, GEORGE F. PETTY, a citizen of the United States, residing at Valley Springs, county of Calaveras, and State of California, have invented certain new and useful Improvements in Jaw-Traps, of which the following is a specification.

This invention relates to jaw traps.

The old style so-called "Newhouse" spring jaw trap has several disadvantages, among which are: tendency of the trigger to throw the animal's foot out from between the jaws, the necessity for making the jaws relatively low, and the fact that the pan is so related to the jaws that unless the animal steps directly upon it or upon the trigger, it is possible for him to put his foot in the trap without springing it, due to the unoccupied space circumscribed by the spread jaws.

Having in mind the foregoing defects of the old style trap, my object is to provide a jaw trap having an improved pan which tends to throw the foot of the animal into the trap instead of out of it, and by which it is insured that the animal's leg will be caught relatively high up if he puts his leg within the space circumscribed by the jaws.

In the accompanying drawings:—Figure 1 is a perspective of the trap when closed; Fig. 2, a side elevation thereof with certain parts broken away and in section; Fig. 3, a view like Fig. 2 but showing the trap set; Fig. 4, a plan view of the trap when set; and Fig. 5, a detail perspective of the pan, pan plate and trigger.

The frame of the trap has a main bed plate 1 with jaw posts 2, as usual. It also has riveted to the bed plate 1 a cross bed plate 3 which, instead of terminating at the plate 1, extends completely thereacross at 4. The cross bed plate has an upwardly turned end 5 provided with a notch or slot 6. Rising from the cross bed plate 4 is a trip or pan plate pivot post 7 which is slotted.

The jaws 8 are pivoted to the post 2, as usual. These jaws may be of different shapes but they will always, preferably, be of U-shaped form. I prefer to provide them with square or flat edges to insure their properly grasping the animal. The actuating springs are shown at 9 and they coöperate with the jaw posts and with the jaw in the usual manner.

The pan or trip plate 10 is elongated and extends above and substantially in line with the bed plate 3, being provided with an angular extension 11 which is received in the slotted part of the post 7 and is pivoted thereto at 12. The pan is formed of a piece of stiff but somewhat springy wire 13 which is arranged so that it will extend out of opposite sides of the pan plate 10 which carries it. I do not wish to limit myself to the precise shape of this springy wire which constitutes the pan, as I am well aware that it may assume forms and constructions differing in detail from the one which I have shown. I prefer, however, to construct the pan 13 of wire which is formed into loops extending out on opposite sides of the plate 10 and connected thereto in any preferred manner, as for instance, by the clamps or staples 14 which are riveted to the under side of the plate 10 or held thereto by nuts. It will be seen that the loops of the pan are free where they extend on opposite sides of the plate 10 and, by reason of their resiliency, if any portion thereof is pressed upon by the foot of the animal, such motion will be at once communicated, without giving the animal a chance to withdraw its foot, to the plate 10, as the looped or open formation of the pan tends to entangle the animal's foot. To lock the jaws in depressed position and to dispose the plate 10 and the pan 13 in set position, there is pivoted to the pan 13 at 15, a trigger 16 whose free end is adapted to be received within the notch or slot 6. Being connected to the pan, the trigger holds the jaws down but, it will be observed, the trigger is adapted to move downwardly with the pan and, as distinguished from the Newhouse type of trigger, which is pivoted to the bed plate, my trigger, if stepped upon by the animal, tends to throw the animal's foot into the jaws instead of to throw it out by the very action of the closing of the jaw, which latter defect is incident to the Newhouse type of trap.

Whenever an animal puts his foot in the trap, he is practically sure to touch some portion of the pan 13 and to entangle his foot in the loop of the pan, in doing which the plate 10 is immediately depressed and the trigger 16 is disengaged from notch or slot 6, whereupon the springs snap the jaws closed. By reason of the space occupied by my pan, I am enabled to employ relatively high jaws and consequently, there is little likelihood of the leg of the animal escaping the grip of the jaws as they tend to catch the leg relatively high up.

I do not limit myself to the details of construction set forth and disclosed in the drawings, nor to the use of wire for the pan 13, as openwork sheet metal could be substituted for the latter, nor do I limit the invention to the exact disposition of the pan and pan plate as shown in Fig. 3 when the trap is set, as various changes and modifications, within the spirit and scope of the invention may be resorted to.

Having thus described my invention, what I claim as new and desire to secure by Letters Patent, is:—

In a jaw trap, the combination with movable jaws, of a depressible pan circumscribed by the jaws when they are open, said pan being composed of a centrally arranged movably mounted bar and depressible resilient loops each connected to the bar and extending freely out on opposite sides thereof, and a trigger for the jaws which is controlled by the pan.

In testimony whereof, I hereunto affix my signature in presence of two witnesses.

GEORGE F. PETTY.

Witnesses:
JOHN KNOOP,
J. T. PLILER.

Copies of this patent may be obtained for five cents each, by addressing the "Commissioner of Patents, Washington, D. C."